(12) United States Patent
Karlsson et al.

(10) Patent No.: US 6,466,466 B1
(45) Date of Patent: Oct. 15, 2002

(54) STABLE ARTIFICIAL NEUTRAL POINT IN A THREE PHASE NETWORK OF SINGLE PHASE RECTIFIERS

(75) Inventors: Mats Karlsson, Huddinge; Tadeus Wolpert, Bandhagen, both of (SE)

(73) Assignee: Telefonaktiebolaget L.M. Ericson, Stockholm (SE)

( * ) Notice: Subject to any disclaimer, the term of this patent is extended or adjusted under 35 U.S.C. 154(b) by 0 days.

(21) Appl. No.: 09/674,573

(22) PCT Filed: May 4, 1999

(86) PCT No.: PCT/SE99/00744

§ 371 (c)(1),
(2), (4) Date: Jan. 3, 2001

(87) PCT Pub. No.: WO99/57800

PCT Pub. Date: Nov. 11, 1999

(30) Foreign Application Priority Data

May 6, 1998 (SE) .............................................. 9801583

(51) Int. Cl.[7] .............................................. H02M 1/14
(52) U.S. Cl. ............................. 363/44; 363/67; 363/125
(58) Field of Search ............................. 363/44, 65, 67, 363/70, 125

(56) References Cited

U.S. PATENT DOCUMENTS

| | | | | |
|---|---|---|---|---|
| 4,143,414 A | * | 3/1979 | Brewster et al. .............. | 363/44 |
| 4,443,759 A | * | 4/1984 | Isaacson et al. .............. | 363/129 |
| 4,513,363 A | * | 4/1985 | Farrow .......................... | 363/70 |
| 5,311,419 A | * | 5/1994 | Shires .......................... | 363/65 |
| 5,574,356 A | | 11/1996 | Parker .......................... | 323/207 |
| 5,757,637 A | * | 5/1998 | Tuck et al. .................. | 363/125 |
| 5,894,414 A | * | 4/1999 | Jiang ............................. | 363/67 |

FOREIGN PATENT DOCUMENTS

| WO | WO 94/27357 | 11/1994 | ............ H02M/7/02 |
|---|---|---|---|

* cited by examiner

*Primary Examiner*—Jeffrey Sterrett
(74) *Attorney, Agent, or Firm*—Harness, Dickey and Pierce, P.L.C.

(57) ABSTRACT

An electric supply system comprising two or more phases (R2, S2, T2), one rectifier (101, 103, 105) for each phase, the second primary terminals of said rectifiers (101, 103, 105) being interconnected, also comprises an Artificial Neutral Point (ANP) creating means (A2) for creating an artificial neutral point (NA2) in the electric supply system, connected in parallel with said rectifiers. The ANP means (A2) short-circuits the zero sequence voltage component of the system but does not affect the positive and negative sequence components. The ANP means (A2) includes magnetic components of such a kind that the vector sum of the phase voltages is zero. According to a first embodiment, the ANP means (A2) comprises one transformer (113, 115, 117) for each phase, the primary winding of each transformer connected to the respective phase (R2, S2, T2) in a star configuration, the secondary windings serially connected and the interconnection point of the primary windings forming an artificial neutral point.

7 Claims, 5 Drawing Sheets

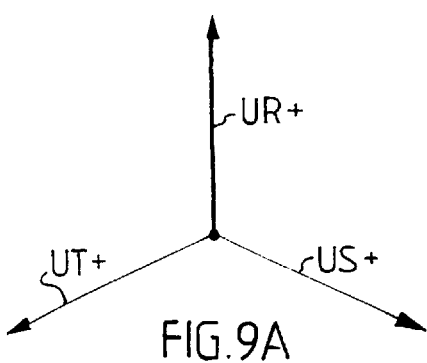
FIG.9A
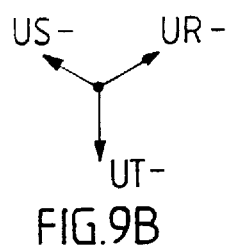
FIG.9B
FIG.9C
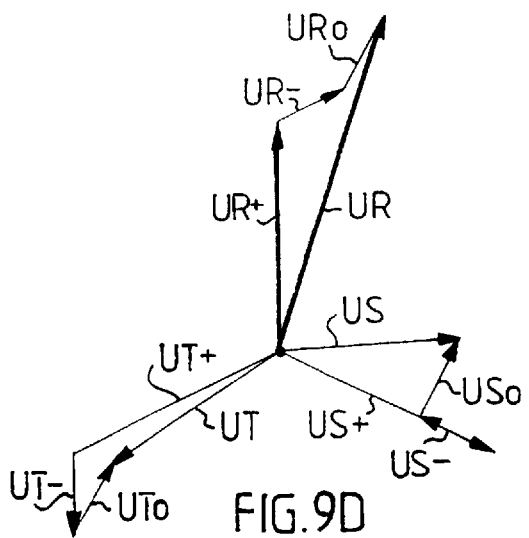
FIG.9D
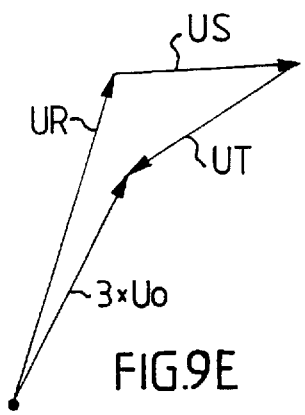
FIG.9E
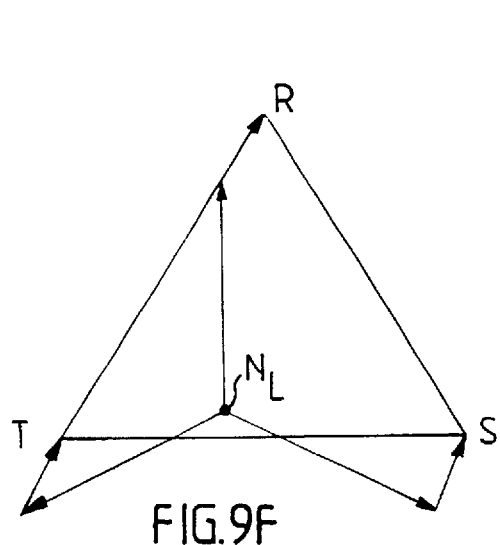
FIG.9F
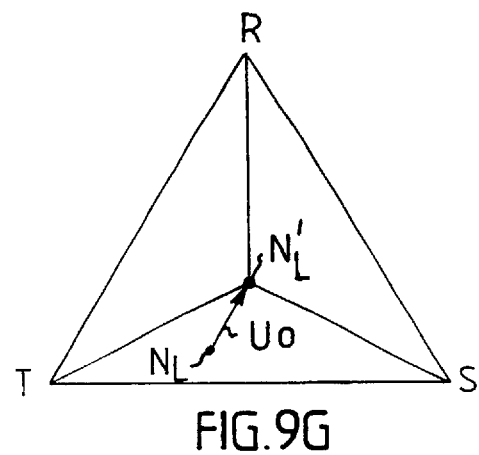
FIG.9G

STABLE ARTIFICIAL NEUTRAL POINT IN A THREE PHASE NETWORK OF SINGLE PHASE RECTIFIERS

BACKGROUND AND SUMMARY OF THE INVENTION

1. Technical Field

The present invention relates to a multiple-phase rectifying apparatus for use in an electric supply system comprising two or more phases, said apparatus comprising a single phase rectifier having a first and a second primary terminal, for each phase, each rectifier connected by its first primary terminal to the respective phase, the second primary terminals of said rectifiers being interconnected.

2. Description of Related Art

Such networks, and such rectifiers are generally known in the art of electric supply systems.

OBJECT OF THE INVENTION

A rectifier for a three phase network may be designed using three single phase rectifiers connected in a star configuration. For example, for a 3×400V network, three 230V rectifiers may be used.

If there is no available neutral point in the three phase network, the neutral point created by the three rectifiers in a star configuration may be unstable. Asymmetric effects between the phases may occur both in the stationary and the transient state. Oscillations may be induced in rectifiers that are normally stable, when supplied from a low impedance network. This is because each rectifier "sees" the mains through two other rectifiers making it a high impedance network.

It is therefore an object of the invention to provide a stable artificial neutral point in a network.

SUMMARY OF THE INVENTION

This object is achieved according to the invention by a multiple-phase rectifying apparatus as initially defined, characterized in that it comprises means connectable in parallel with said single-phase rectifiers for creating a neutral point in the electric supply system.

By creating a neutral point in the system, the connection of three single-phase rectifiers in a star configuration with phase voltages that are as equal as possible is enabled.

Also, the creation of a neutral point independently of the neutral point of the supply network, especially in cases where the neutral potential is not located in the middle of the phase vector system is enabled.

The means for creating a neutral point is not connected to the neutral conductor of the electric system.

The means for creating a neutral point preferably includes magnetic components of such a kind that the vector sum of the phase voltages is zero. Preferably, said means for creating a neutral point is arranged to short-circuit the zero sequence component of the phase voltages without affecting the positive and negative sequence components.

According to a first preferred embodiment the means for creating a neutral point comprises one transformer for each phase, the primary winding of each transformer connected to the respective phase in a star configuration, the secondary windings serially connected and the interconnection point of the primary windings forming said neutral point.

According to a second preferred embodiment the means for creating a neutral point comprises one winding for each phase, each winding wound on one leg of a common three-legged core, one end of each winding connected to the respective phase and the other end of each winding being interconnected, the interconnection point of the windings forming said neutral point.

According to a third preferred embodiment the means for creating a neutral point comprises a first, a second and a third transformer, each transformer comprising a first and a second winding, and each phase being connected to the artificial neutral point through the first winding of one transformer and the second winding of another transformer in the opposite direction from said first winding, in a zigzag coupling.

This third preferred embodiment has the advantage that since no secondary windings are used, the size of the component may be reduced, or the cross section of the conductor used in the winding may be increased, thereby reducing the impedance of the transformer, without increasing the size of the component.

The means for creating a neutral point according to the invention may also be used in a supply system in which the neutral point is not found in the centre of the phase diagram of the system, for example a supply system used in Japan.

The means creates a neutral point to which the zero sequence component of the phase voltages has a low impedance connection while the positive sequence and negative sequence components have high impedance connections.

Connecting the means for creating a neutral point does not affect positive and negative sequence voltage components, that is, it does not affect the supply system, which constitutes a positive sequence system.

The invention requires the addition of magnetic components of the order of magnitude of 5% of the power of the rectifier.

The invention offers the following advantages:

Any kind of single phase rectifier may be used, thus, a stable three-phase rectifier can be achieved at a relatively low cost.

The rectifier according to the invention can be used both for two and three phases.

The artificial neutral point achieved in this way does not cause any additional load in the supply system.

The zero sequence component of the phase voltages is short-circuited.

The third harmonic component and its multiples are short-circuited.

Other advantages include the possibility to change from a 3×400V network to a 3×230V network using the same single-phase rectifiers, and to operate when one phase is missing.

BRIEF DESCRIPTION OF THE DRAWINGS

FIGS. 9A–9G are phase diagrams illustrating the inventive idea.

DETAILED DESCRIPTION OF EMBODIMENTS

Figure 1:
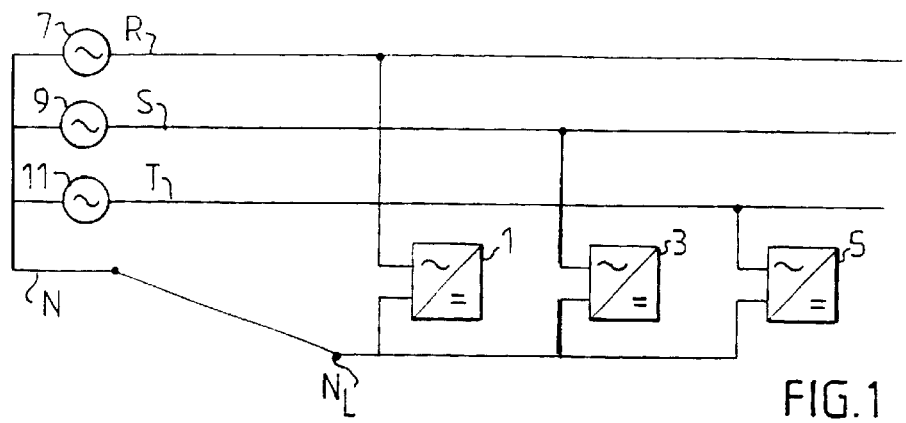
FIG. 1 shows a prior art three phase rectifier based on single phase rectifiers.

FIG. 1 shows a prior art three phase rectifier based on single phase rectifiers. The first primary terminal of three single phase rectifiers 1, 3, 5 are connected to the three phases R, S, T of a three phase network. The second primary terminals are interconnected, that is, the rectifiers are connected in a star configuration. The neutral conductor N must be connected, as shown in the Figure.

The phase voltage of each phase is indicated schematically by a voltage generator, 7, 9, 11, respectively.

Figure 2:
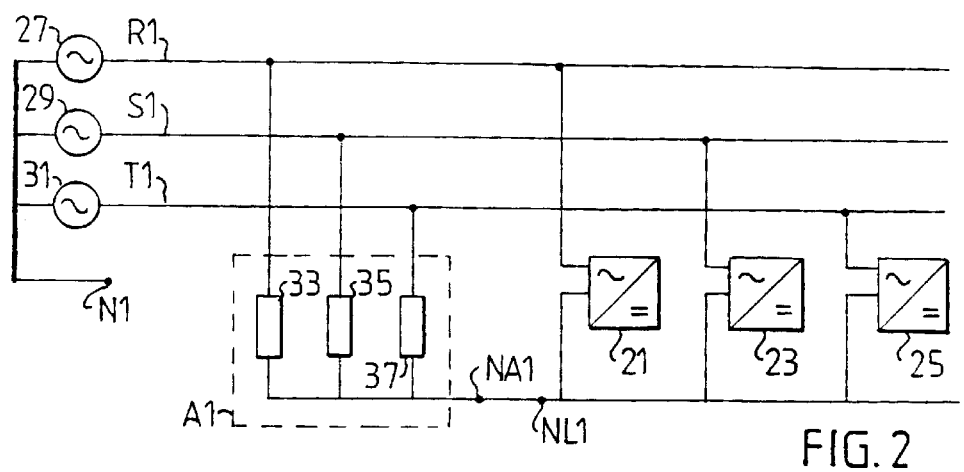
FIG. 2 shows a three-phase rectifier with means for achieving an artificial neutral point.

FIG. 2 shows a three phase rectifier similar to the one shown in FIG. 1. The first primary terminal of three single phase rectifiers 21, 23, 25 are connected to the three phases R1, S1, T1 of a three phase network. The secondary terminal are interconnected to form an artificial neutral point NL1. The neutral conductor N1 of the network is not connected. The phase voltages are represented by a voltage generator, 27, 29, 31, respectively, for each phase. An artificial neutral point creation (ANP) means A1 is connected in parallel with the rectifiers 21, 23, 25. The balancing means A1 comprises three impedances 33, 35, 37, one of said impedances 33, 35, 37 connected in parallel with each rectifier 21, 23, 25. The output terminals of the impedances 33, 35, 37 are interconnected to form an artificial neutral point NA1.

This solution is only feasible if the impedances 33, 35, 37 are very small, and is only for explanation purposes.

Figure 3:
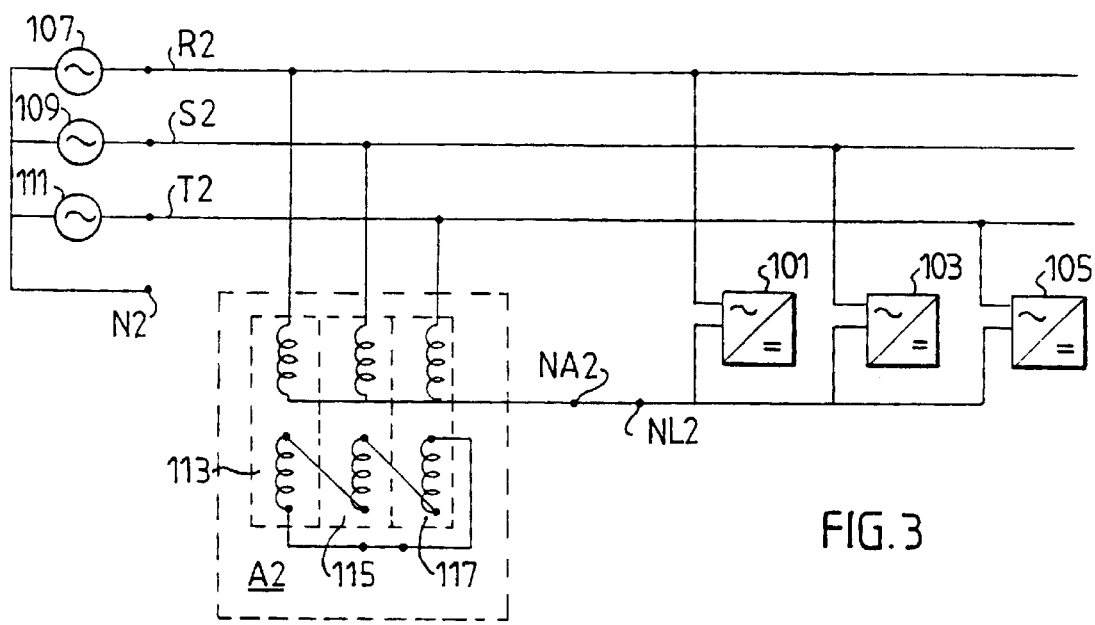
FIG. 3 shows a first embodiment of the invention used with a three-phase system.

FIG. 3 shows a three phase rectifier according to a first preferred embodiment of the invention. As in FIG. 1, three single phase rectifiers 101, 103, 105 are connected to the three phases R2, S2, T2 of a three phase network. The neutral conductor N2 of the three-phase network is not available, or not connected. The secondary terminal of the rectifiers 101, 103, 105 are interconnected in a point NL2. Three voltage sources 107, 109, 111 represent the voltage on the phases R2, S2, T2, respectively.

An ANP unit A2 comprising three small transformers 113, 115, 117 provides the artificial neutral point NA2, which is connected to the interconnected second primary terminals of the rectifiers 101, 103, 105. The primary windings of the transformers 113, 115, 117 are interconnected in a star configuration. One end of each primary winding is connected to each of the phases R2, S2, T2, respectively. The secondary windings are serially connected in an open delta connection.

Because of the ANP means the zero sequence component is short-circuited, while the positive and negative sequence components are not affected. The neutral potential will be positioned in the centre of gravity of a triangle built of the phase voltage vectors, that is, the phase voltage vector sum will be zero. This will be explained in more detail below.

Figure 4:
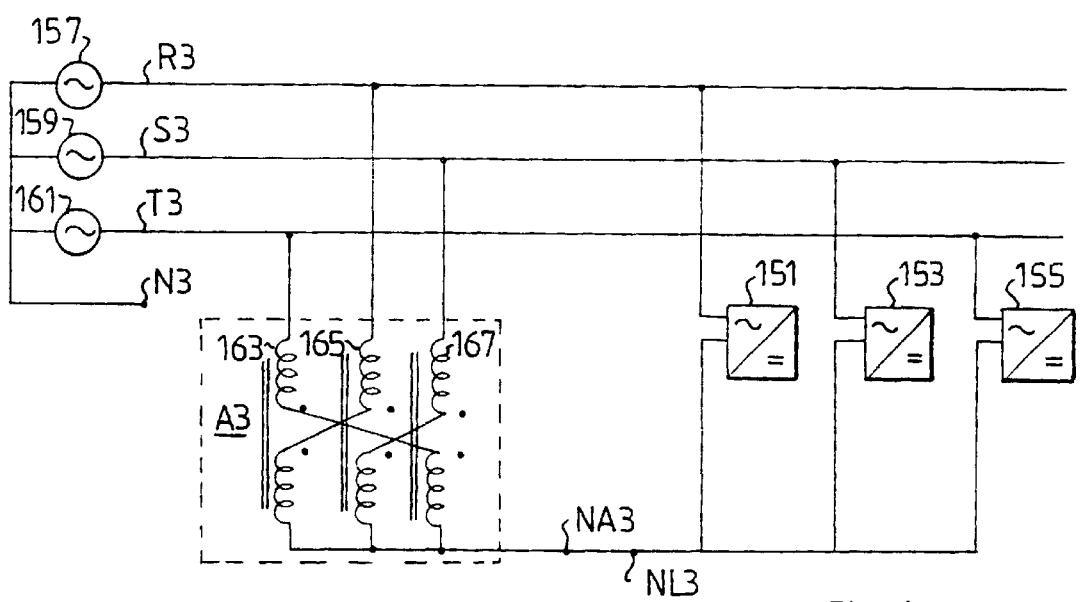
FIG. 4 shows a second embodiment of the invention used with a three-phase system.

FIG. 4 shows a three phase rectifier according to a second preferred embodiment of the invention. As before, there is a three phase system with three rectifiers 151, 153, 155, a first terminal of one rectifier connected to each phase R3, S3, T3, respectively and second terminals of the three rectifiers 151, 153, 155 interconnected in a point NL3. The neutral conductor N3 is not connected. The phase voltages are represented by a voltage generator, 157, 159, 161, respectively, for each phase. As in FIG. 3, an ANP means A3 is connected, which in this embodiment comprises a first, a second and a third one phase transformers 163, 165, 167, respectively, each having a first and a second winding on a separate core. All windings have the same number of turns.

Said windings are connected in such a way that each phase R3, S3, T3 is connected to the artificial neutral point NA3 through one winding of one transformer and one winding of another transformer in the opposite direction, in a so called zigzag coupling. The windings are in the example shown in FIG. 4, the R phase R3 is connected through the first winding of the second transformer 165 and the second winding of the first transformer 163. The S phase S3 is connected through the first winding of the third transformer 167 and the second winding of the second transformer 165. The T phase T3 is connected through the first winding of the first transformer 163 and the second winding of the third transformer 167. The selection of first and second windings may be made arbitrarily, as long as each phase is connected through two different transformers.

Figure 5:
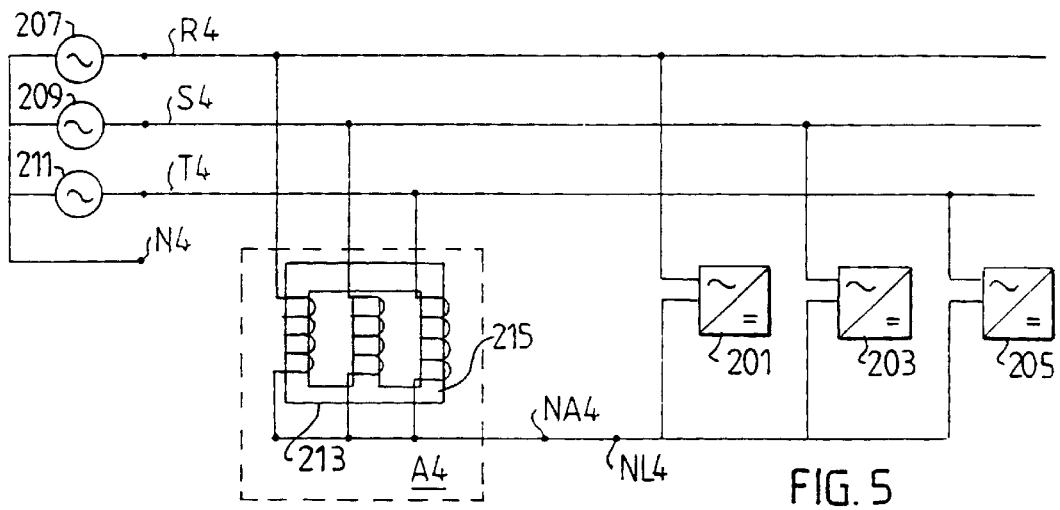
FIG. 5 shows a third embodiment of the invention used with a three-phase system.

FIG. 5 shows a three phase rectifier according to a third preferred embodiment of the invention. As before, there is a three phase system with three rectifiers 201, 203, 205, a first terminal of one rectifier connected to each phase R4, S4, T4, respectively and second terminals of the three rectifiers 201, 203, 205 interconnected in a point NL4. The neutral conductor N4 is not connected. The phase voltages are represented by a voltage generator, 207, 209, 211, respectively, for each phase. As in FIG. 3 an ANP means A4 is connected, which in this embodiment comprises a three-phase inductor 213 with a core 215 comprising three legs with a winding on each leg. Each winding is connected to the respective phase R4, S4, T4, and the windings are interconnected to form an artificial neutral point NA4.

The inductor 213 behaves in the same way as three transformers in situations where the sum of the phase voltages is zero. If a zero sequence component occurs in the voltages, the corresponding flux cannot close through the core 215 but must close in the surrounding air. The magnetization impedance of this zero sequence component is so low that the inductor 213 will function as if it were short circuited for this component. In this case the core 215 will cause the same type of effect that was caused by the serially connected secondary windings in the embodiment shown in FIG. 3.

Figure 6:
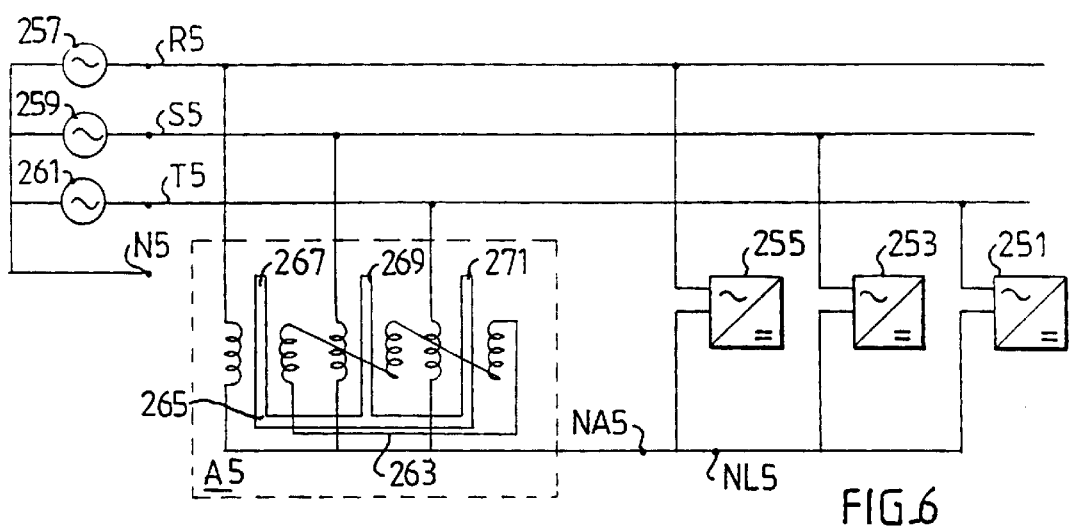
FIG. 6 shows a fourth embodiment of the invention used with a three-phase system.

FIG. 6 shows a fourth embodiment of the invention applied to a three phase system. As before, there is a three phase system with three rectifiers 251, 253, 255, a first terminal of one rectifier connected to each phase R5, S5, T5, respectively and second terminals of the three rectifiers 251, 253, 255 interconnected in a point NL5. The neutral conductor N5 is not connected. The phase voltages are represented by a voltage generator, 257, 259, 261, respectively, for each phase. As in FIG. 3, an ANP means A5 is connected, which in this embodiment comprises a three-phase transformer 263 with a core 265 comprising three legs 267, 269, 271 with a primary and a secondary winding on each of the three legs 267, 269, 271. Each primary winding is connected to the respective phase R5, S5, T5. The secondary windings are serially connected in a delta configuration. The primary windings are interconnected in a star configuration to form an artificial neutral point NA5.

Figure 7:
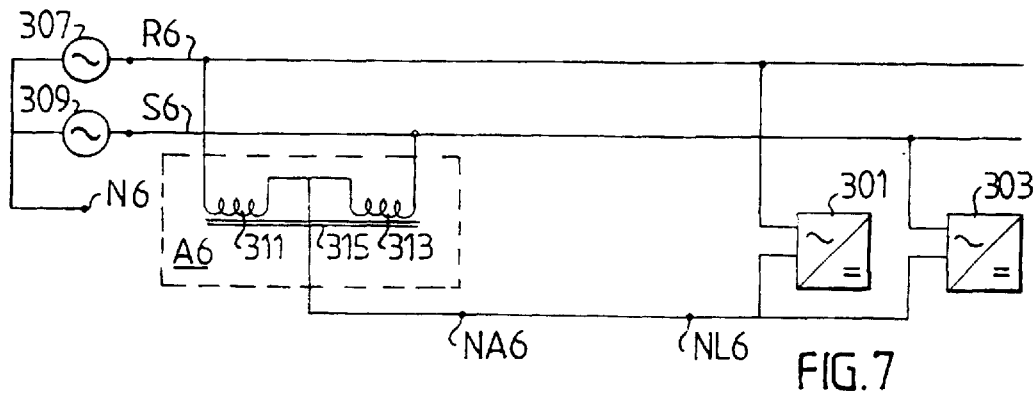
FIGS. 7 and 8 show a two-phase rectifier according to two other embodiments of the invention.

FIG. 7 shows an embodiment similar to the one shown in FIG. 5, applied to a two-phase system, for example with two 200V rectifiers serially connected to form a main voltage of 400V. The apparatus then causes the input voltages of the rectifiers to be equal.

A first 301 and a second 303 rectifier are connected to phase R6 and S6, respectively and their second primary terminals are interconnected in a point NL6. The neutral conductor N6 is not connected. The phase voltages are represented by voltage generators 307, 309. A balancing means A6 is connected in parallel with the rectifiers 301, 303. The balancing means comprises a first 311 and a second 313 winding on the same core 315. An artificial neutral point NA6, is created between the windings, and is connected to the secondary side of the rectifiers 301, 303.

Figure 8:
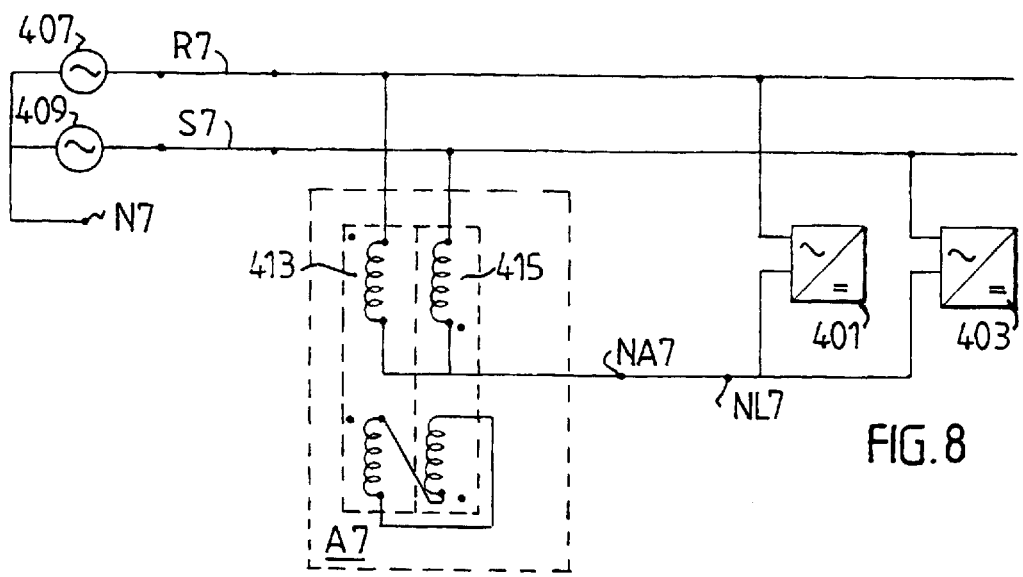

FIG. 8 shows an embodiment similar to the one shown in FIG. 3, applied to a two phase system.

As before, a rectifier 401 and 403, respectively, is connected to each of the phases R7, S7. The second primary terminals of the rectifiers 401, 403 are interconnected, to form a neutral point NL7. The voltages on the two phases R7, S7 are represented by voltage generators 407, 409. The neutral conductor N7 is not connected. A balancing means A7 is connected, comprising two transformers 413, 415. Each one of the primary windings of the two transformers 413, 415 is connected to one of the phases, and they are interconnected to form an artificial neutral point NA7. The secondary windings are serially connected.

Normally there is no current in the secondary windings and their voltages compensate for each other. Any difference between the two transformer voltages would generate a current in the secondary windings which would restore the equal flow, forcing the transformers to equalize their input voltages.

This also explains why the two input voltages cannot oscillate with opposite phases. Such an oscillation would cause periodic differences between the voltages across the primary windings which are impossible because of the secondary windings.

If an ANP means is not connected, the potential of the neutral point NL of the rectifiers may differ from the potential at the neutral point of the supply network, so that the phase voltages across the rectifiers will constitute an asymmetric vector system. In the following, the function of the invention in the case of such an asymmetric three phase vector system of phase voltages, UR, US, UT will be analysed using theory for symmetric components.

In a three-phase system, the voltage of each phase may be represented by three voltage components: a positive sequence, a negative sequence and a zero sequence component, respectively. The positive sequence components, having the phase sequence R, S, T, the negative sequence components for which the phase sequence is R, T, S, and the zero sequence components which is equal in size and phase in all three phase, as shown in FIGS. 9a, b and c.

In the example of the embodiment shown in FIG. 3, the following is valid: If the phase voltages in a three-phase system constitute a positive sequence vector system, the vector sum can be expressed as:

$$(UR+)+(US+)+(UT+)=0 \quad (1)$$

as shown in FIG. 9A, UR+, US+ and UT+ being the respective phase voltages in a positive sequence system in which the phase difference between the phases is 120°. In this case no voltage is induced in the secondary windings of FIG. 3. No current will flow in the secondary windings of the transformers 113, 115, 117 of FIG. 3, and the impedance of the transformers will be very high, corresponding to the magnetization impedance.

When the phase voltages are a negative sequence vector system UR−, US−, UT− with a 120° phase difference between the phases, the vector sum is also 0, as shown in FIG. 9B. In this case no voltage is induced in the secondary windings of the transformers 113, 115, 117. No current will flow in the secondary winding, the impedance of the transformers will be very high, corresponding to the magnetization impedance.

FIG. 9C shows a zero sequence vector system UR0, US0, UT0, in which the secondary voltages have the same phase and thus add up. In this case, a current will flow in the secondary windings of the transformers, which will be short-circuited. Each transformer has a short circuit impedance at its primary side which is generally much lower than the input impedance of the rectifiers.

When the phase voltages constitute a combination of positive sequence and negative sequence vector systems, they have different sizes, and the phase angle between them is no longer 120°, but their vector sum is still equal to zero.

In FIG. 9D, the phase voltages constitute combination of the positive sequence, negative sequence and zero sequence vector systems of FIGS. 9A, 9B and 9C. The three phase voltages are then:

$$UR=(UR+)+(UR-)+(UR0)$$

$$US=(US+)+(US-)+(US0)$$

$$UT=(UT+)+(UT-)+(UT0)$$

The phase voltages then have different sizes and the phase angle between them is no longer 120°. Their sum is equal to three times the zero sequence component, that is, 3×U0, as shown in FIG. 9E.

Because of the zero sequence component, a current flows in the secondary winding, which is short circuited. Each transformer 113, 115, 117 has a short circuit impedance at its primary side which is generally much lower than the input impedance of the rectifiers.

In the general case, the neutral point can be given a potential such that the phase voltages UR, US, UT comprise positive sequence, negative sequence and zero sequence components, as shown in FIGS. 9D and 9E.

FIG. 9F shows a system in which the phase voltages are a combination of a positive sequence component from the supply system and a zero sequence component caused by differences in the rectifiers. The phase diagram forms a triangle RST, with the neutral point NL located in the triangle, but not in its centre of gravity.

FIG. 9G shows the same system after a balancing unit like the one shown in FIG. 3 or FIG. 5 is connected. The balancing unit creates an artificial neutral point N'L to which the zero sequence component has a low impedance connection while the positive sequence and negative sequence components have high impedance connections. As can be seen the artificial neutral point N'L is displaced by a vector U0=UR0=US0=UT0 relative to the neutral point NL.

Connecting the balancing unit A2, A3, A4, A5 does not affect positive and negative sequence components, that is, it does not affect the supply system, which constitutes a positive sequence system. Any zero sequence components are short circuited, except for the short circuit impedance of each transformer. This implies that when a balancing unit A2, A3, A4, A5 is connected, NL is shifted to N'L as shown in FIG. 9G. The potential of the neutral point of the rectifiers NL is shifted to N'L so that the sum of the phase voltages becomes zero.

This, in turn means that

The phase voltages become as equal as the main voltages URS, UST, UTR between the phases R and S, S and T, and T and R, respectively will allow. In a positive sequence system they become equal.

The phase voltages cannot oscillate, as the potential of the neutral point is fixed.

The third harmonic component and its multiples in the neutral point potential, having the same phase in all three phases, are short circuited in the same way as the zero sequence component.

Thus, the artificial neutral point in a three phase system functions in a similar way as the neutral point of the supply system, providing the short circuit impedance of the transformer is sufficiently low that the current does not cause a significant voltage drop.

In the above discussion it has been assumed that the sum of the primary currents of the rectifiers is approximately zero. If this is not the case, a load current would flow between the neutral points NL and NA causing an additional voltage drop. It follows that the dimensioning of the transformers would be affected.

It can be shown that short-circuiting of the zero sequence component as in FIG. 9G brings the artificial neutral point to the centre of gravity of the triangle RST. This is shown in FIG. 9G for a symmetrical triangle RST, but is also true in the general case of an asymmetric triangle RST.

What is claimed is:

1. A multiple-phase rectifying apparatus for use in an electric supply system comprising two or more phases, said apparatus comprising a single-phase rectifier having a first and a second primary terminal, for each phase, each rectifier connected by its first primary terminal to the respective phase, the second primary terminals of said rectifiers being interconnected, said apparatus comprising means connectable in parallel with said single-phase rectifiers to both primary terminals of each phase, for creating an artificial neutral point in the electric supply system, characterized in that said means comprises magnetic components of such a kind and arranged in such a way that the vector sum of the phase voltages across the magnetic components becomes equal to zero.

2. A rectifying apparatus according to claim 1, characterized in that said means is arranged to short-circuit the zero sequence component of the phase voltages without affecting the positive and negative sequence components.

3. A rectifying apparatus according to claim 1, characterized in that said means is not connected to the neutral point of the system.

4. A rectifying apparatus according to claim 1, characterized in that said magnetic components comprise at least one winding for each phase, wound on a common core, one end of each winding connected to the respective phase and the other ends interconnected, the interconnection point constituting said artificial neutral point.

5. A rectifying apparatus according to claim 1, characterized in that said magnetic components comprise one transformer for each phase the primary winding of each transformer connected to the respective phase in a star configuration, the secondary windings serially connected and the interconnection point of the primary windings forming said artificial neutral point.

6. A rectifying apparatus according to claim 1, wherein said magnetic components comprise a first, a second and a third transformer, each transformer comprising a first and a second winding, and each phase being connected to the artificial neutral point through the first winding of one transformer and the second winding of another transformer in the opposite direction from said first winding in a zigzag coupling.

7. An electric supply system comprising two or more phases and a multiple-phase rectifying apparatus including one single-phase rectifier having a first and a second primary terminal for each phase, each rectifier connected by its first primary terminal to the respective phase, the second primary terminals of said rectifiers being interconnected, and said apparatus including means connectable in parallel with said single-phase rectifiers to both primary terminals of each phase, for creating an artificial neutral point in the electric supply system, said means including magnetic components of such a kind and arranged in such a way that the vector sum of the phase voltages across the magnetic components becomes equal to zero.

* * * * *